United States Patent
LeBeau et al.

(10) Patent No.: US 9,129,012 B2
(45) Date of Patent: Sep. 8, 2015

(54) INFORMATION SEARCH SYSTEM WITH REAL-TIME FEEDBACK

(75) Inventors: Michael J. LeBeau, Palo Alto, CA (US); Prasenjit Phukan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 208 days.

(21) Appl. No.: 12/699,532

(22) Filed: Feb. 3, 2010

(65) Prior Publication Data

US 2011/0191364 A1 Aug. 4, 2011

(51) Int. Cl.
*G06F 17/30* (2006.01)

(52) U.S. Cl.
CPC ................. *G06F 17/30672* (2013.01)

(58) Field of Classification Search
CPC ........................................... G06F 17/30
USPC ............................................. 707/767
See application file for complete search history.

(56) References Cited

U.S. PATENT DOCUMENTS

| | | | | |
|---|---|---|---|---|
| 5,873,095 | A * | 2/1999 | Gore ....................... | 1/1 |
| 7,945,683 | B1 * | 5/2011 | Ambrose et al. .......... | 709/228 |
| 8,392,530 | B1 * | 3/2013 | Manapragada et al. .... | 709/219 |
| 2005/0257400 | A1 * | 11/2005 | Sommerer et al. ......... | 36/13 |
| 2005/0283458 | A1 * | 12/2005 | Galindo-Legaria et al. | 707/1 |
| 2007/0050351 | A1 * | 3/2007 | Kasperski et al. ......... | 707/4 |
| 2007/0088686 | A1 | 4/2007 | Hurst-Hiller et al. | |
| 2007/0162422 | A1 * | 7/2007 | Djabarov .................. | 707/2 |
| 2008/0201452 | A1 * | 8/2008 | Athas et al. .............. | 709/219 |
| 2009/0234814 | A1 * | 9/2009 | Boerries et al. ........... | 707/3 |
| 2010/0146012 | A1 * | 6/2010 | Beaudreau et al. ........ | 707/803 |

FOREIGN PATENT DOCUMENTS

| | | |
|---|---|---|
| CN | 101268463 | 9/2008 |
| JP | 2001-249933 | 9/2001 |
| JP | 2005527888 | 9/2005 |
| JP | 2006079368 | 3/2006 |
| JP | 2006163645 | 6/2006 |
| JP | 2007034466 | 2/2007 |
| JP | 2008217068 | 9/2008 |
| JP | 2009506429 | 2/2009 |
| JP | 2009-512068 | 3/2009 |
| JP | 2009-237750 | 10/2009 |
| WO | 03/075547 | 9/2003 |
| WO | 2007/024645 | 3/2007 |

OTHER PUBLICATIONS

PCT Notification of Transmittal of the International Search Report and the Written Opinion of the International Searching Authority, International Application No. PCT/US2010/025644 mailed Jul. 8, 2010 (11 pages).

(Continued)

*Primary Examiner* — Amresh Singh
(74) *Attorney, Agent, or Firm* — Fish & Richardson P.C.

(57) ABSTRACT

Methods, systems, and apparatus, including computer programs encoded on a computer storage medium, for providing live search suggestions. In one aspect, a method includes obtaining a suggested query term by a client device, initiating a live query to obtain live content relating to the suggested query term responsive to obtaining the suggested query term, obtaining the live content, and displaying the live content on a user interface of the client device.

21 Claims, 8 Drawing Sheets

(56) References Cited

OTHER PUBLICATIONS

Holger Bast et al., "Type Less, Find More: Fast Autocompletion Search with a Succinct Index," Aug. 11, 2006, XP-002588294, pp. 364-371.

Notification Concerning Transmittal of International Preliminary Report on Patentability issued in PCT/US2011/025644 on Aug. 16, 2012, 7 pages.

Office Action issued in Chinese Application No. 201080065329.6, dated Jan. 4, 2015, 13 pages (with English translation).

Office Action issued in Australian Application No. 2010345063 on Feb. 2, 2015, 3 pages.

Office Action issued in Japanese Application No. 2014-093434 on Mar. 23, 2015, 6 pages (with English translation).

Office Action issued in Japanese Application No. 2012-551956 on Oct. 8, 2013, 6 pages (with English translation).

Office Action issued in Australian Application No. 2010345063 on Jun. 13, 2014, 3 pages.

Office Action issued in Israeli Application No. 221168 on May 31, 2015, 4 pages (with English translation).

\* cited by examiner

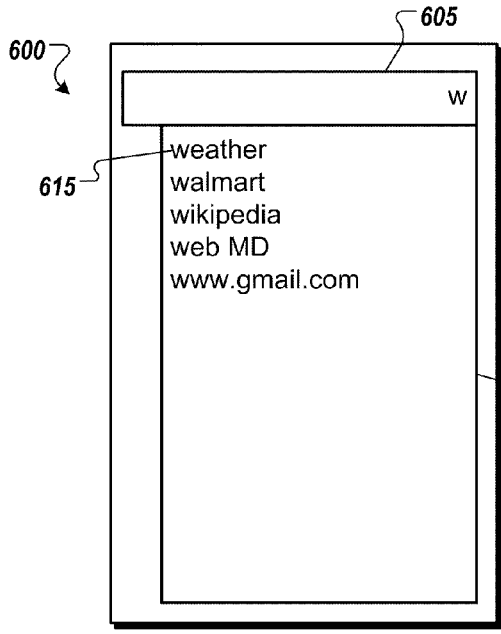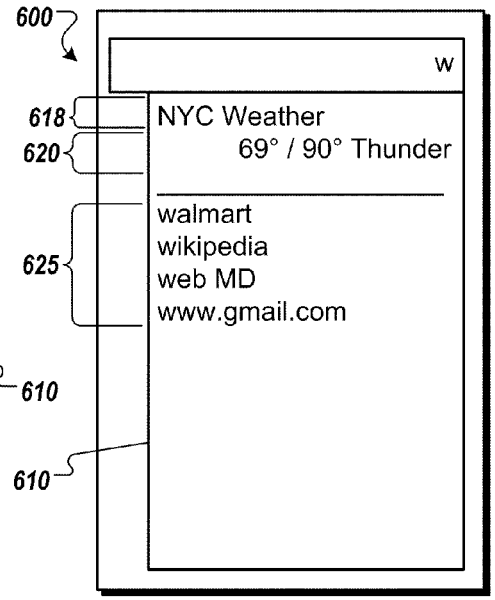
FIG. 6A    FIG. 6B
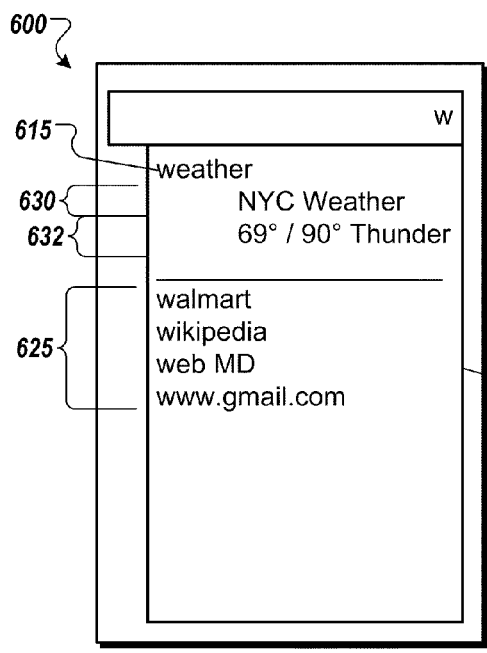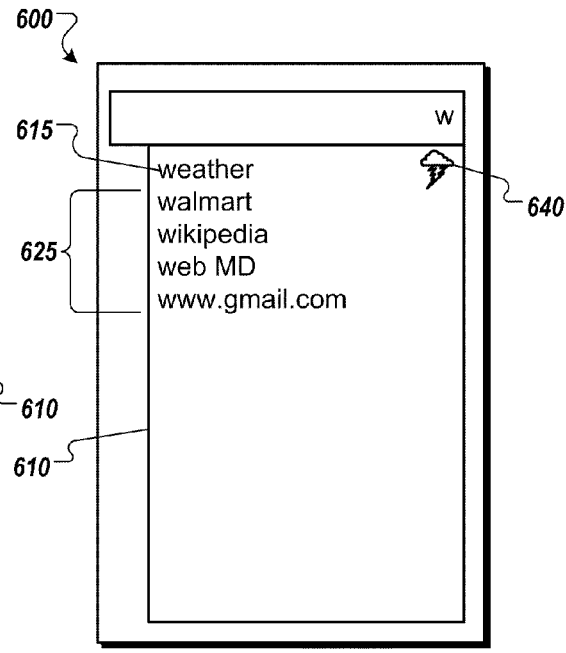
FIG. 6C    FIG. 6D

INFORMATION SEARCH SYSTEM WITH REAL-TIME FEEDBACK

BACKGROUND

This specification relates to search engines.

As the amount of information available on the Internet has dramatically increased, users have had a difficult time formulating effective search queries for locating specific, relevant information. In recent years, competition among search engine providers has caused an explosive acceleration in the evolution of search engine algorithms, as well as in the user interfaces that are used to display search results.

SUMMARY

When a user enters a query term into a search box or other form of search field, a search engine may respond by generating and providing suggested query terms using any number of appropriate query revision strategies. In one example, a suggested query term may be a full word that the user had just started to type, or a suggested query term that the user had selected in the past. In another example, a suggested query term may be a term that, when it was used by other users of the search engine in the past to execute search queries, generated search results that were more satisfying to those users than a search result that was generated using the query term that the user entered. In other examples, the suggested query term may be a term that the user might have intended to enter, or would have entered had the user either been more experienced with using the search engine, or been aware of additional facts.

Regardless of which query revision strategy is used, however, the suggested query terms themselves may be generated based on past information, such as users' past activities, predefined query formats, or predetermined query reformulation rules. Since they provide no insight to any real-time information or status associated with a person, place, event or other thing that they refer to, suggested query terms themselves are considered by this specification to be "static," "stale," or "un-updated" content.

In one innovative aspect of the subject matter described in this specification, instead of merely generating and providing suggested query terms or other static content alone, the search engine may use the suggested query terms to obtain other "live" content regarding a person, place, event or other thing referred to by the suggested query terms, in real-time or near real-time to generating the suggested query terms themselves. This additional content is referred to by this specification as "live," "fresh," "real-time," "current," or "updated" content, information, or feedback, since it is obtained (and is therefore "live") at or shortly after the time when the suggested query terms are generated by the search engine, and therefore reflects real-time information. Since the content may not be current at the exact moment that the suggested query term is generated or at the moment that a user enters a partial or whole query term, the live content may instead be referred to as "substantially live" content. Once obtained, live content may be presented to the user instead of, or in addition to, presenting the associated suggested query term.

For example, responsive to generating the suggested query term, "weather New York," the search engine or a client device may automatically perform a query (referred to as a "live query," or a "substantially live query") to determine or identify, as the live content, weather information for New York city, current at or shortly after a time when the suggested query term was generated. This current weather data, which reflects real-time or near-real-time information, may be provided to the user through a user interface of a client device, along with or instead of the suggested query term itself. This live content may be processed by the client device or the search engine before it is presented to the user, and may include text data (e.g., a three digit current temperature reading, or an XML document that includes current weather data) or other types of data (e.g., an image or an icon that suggests the state of the current weather, or a sound file of a spoken weather report).

In general, another innovative aspect of the subject matter described in this specification may be embodied in methods that include the actions of obtaining a suggested query term by a client device, initiating a live query to obtain live content relating to the suggested query term responsive to obtaining the suggested query term, obtaining the live content, and displaying the live content on a user interface of the client device. Other embodiments of this aspect include corresponding systems, apparatus, and computer programs, configured to perform the actions of the methods, encoded on computer storage devices.

These and other embodiments may each optionally include one or more of the following features. For instance, live content may be displayed among a list of suggested query terms, on a drop-down menu beneath a search box, in place of the suggested query term on the list of suggested query terms, or adjacent to the suggested query term on the list of suggested query terms. Obtaining the suggested query term may further include receiving a user-input query term, and generating the suggested query term using the user-input query term, or accessing a user's personalized search history, and generating the suggested query term using the user's personalized search history. The suggested query term may be obtained without requiring a user to enter a query term, and the live query may be automatically initiated responsive to obtaining the suggested query term.

When the suggested query term identifies a business, a location, a point-of-interest (POI), or a person, the live content may be a current stock price for the business, current weather information for the location, a distance between the POI and a current location of a client device, or a status of the person, respectively. The live query may include the suggested query term itself. The actions may include determining that a user has selected a control to invoke a search dialogue, where the suggested query term is automatically obtained responsive to determining that the user has selected the control, or the actions may include detecting that the user has selected a link that includes the live content, and accessing a web document relating to the suggested query term based on detecting that the user has selected link. The live content may represent information that relates to the suggested query term that is current at a time when the live query is submitted. The live content may represent information relating to the suggested query term that is current at a time when the live query is performed. Obtaining the suggested query term may include generating the suggested query term, or receiving the suggested query term from a search engine.

In general, another innovative aspect of the subject matter described in this specification may be embodied in methods that include the actions of generating a suggested query term by a search engine, executing a query to obtain live content relating to the suggested query term responsive to generating the suggested query term, obtaining the live content, and providing the live content to a client device. Other embodiments of this aspect include corresponding systems, apparatus, and computer programs, configured to perform the actions of the methods, encoded on computer storage devices.

In general, another innovative aspect of the subject matter described in this specification may be embodied in methods that include the actions of receiving a partial query term from a user, and generating, based on the partial query term, a suggested query term that includes the partial query term. The actions also include, responsive to generating the suggested query term, initiating a live query of a third-party content provider to obtain substantially live content that relates to the suggested query term, the live content comprising information that is associated with the suggested query term and that is substantially current at a time, or after the time, when the suggested query term is generated, receiving the live content from the third-party content provider, and providing the suggested query term and the live content to a client device for display adjacent to each other.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIGS. 5A-5C and 6A-6D show examples of a search user interface in various search context dependent states.

Like reference numbers represent corresponding components throughout.

DETAILED DESCRIPTION

Figure 1:
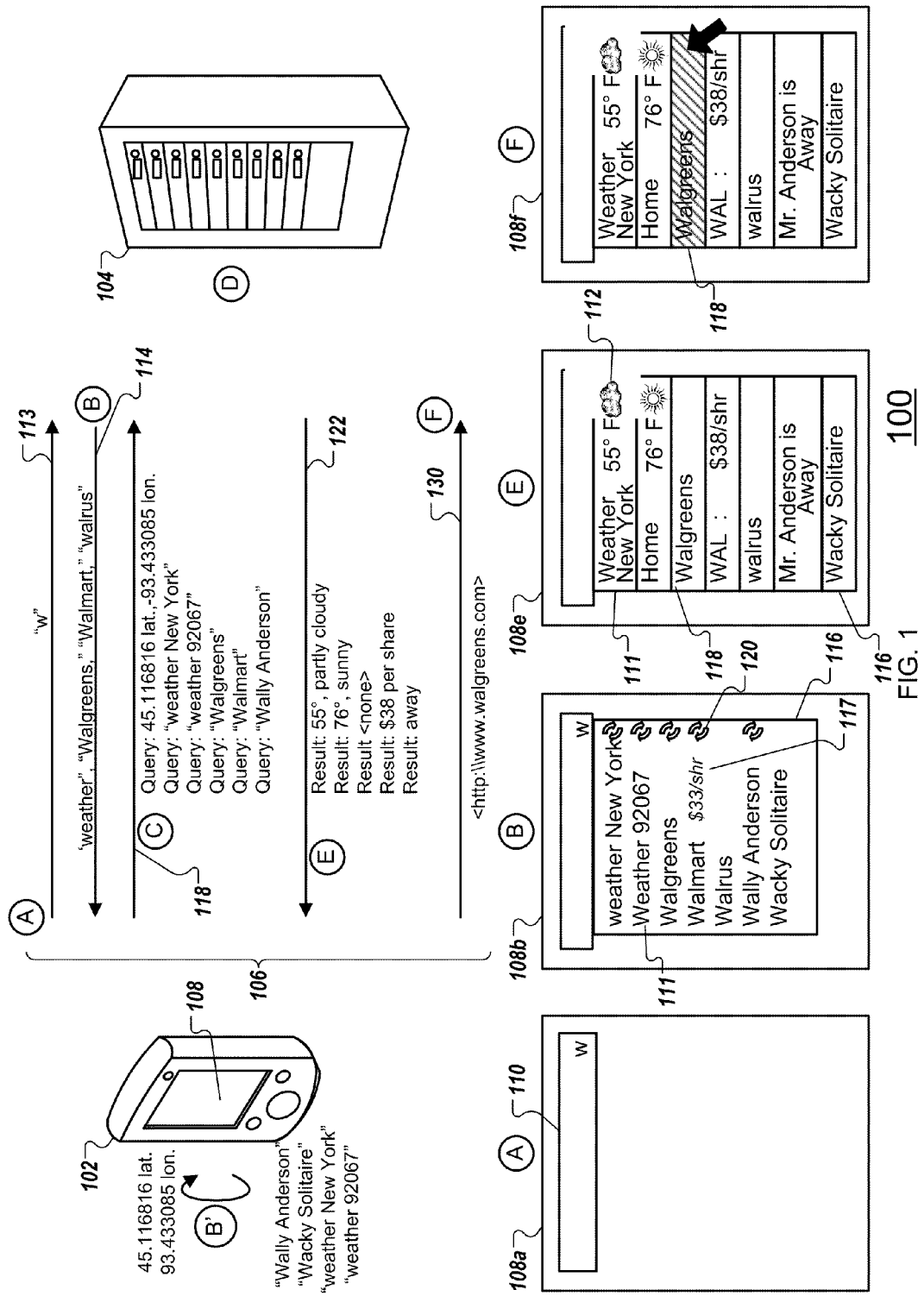
FIG. 1 is a contextual diagram of an exemplary framework for providing real-time feedback in an information search system.

FIG. 1 is a conceptual diagram of an exemplary framework for providing real-time feedback in an information search system 100. More particularly, the diagram depicts a client device 102 (e.g., a cellular telephone, a PDA, or a personal computer) and a search engine 104 that make up the information search system 100, and also depicts both a flow of data 106 between the client device 102 and the search engine 104, and a user interface 108 of the client device 102 in various states (labeled as user interface 108a to 108f, in time-sequenced states "A" to "F," respectively). As the computing capability and storage capacity of electronic devices has increased, the opportunity has arisen for developers of applications, devices and systems (such as the client device 102 and the search engine 104) to take advantage of these enhancements in order to provide users with a richer, more responsive, and more satisfying and engrossing search experience, such as by providing the real-time feedback that is described below.

A user of the client device 102 may initiate a search for information stored on a public or private network by entering a part of a query term, or one or more complete query terms into a search box 110 of the user interface 108. The client device 102 may also initiate a search for information by selecting a control that invokes a search dialogue, without explicitly entering a query term, in which case the entered query term will be treated as a null value. For brevity, this specification refers to both a portion of a query term, or a complete query term (that itself includes single characters, or one or more partial or complete words, phrases, series of characters, or expressions), as a "user-entered query term," or simply an "entered query term."

In general, the client device 102 and the search engine 104 interact using a query and response approach, in that the client device 102 sends a search query request that includes one or more query terms (such as the entered query term) to the search engine 104, and the search engine 104 executes the search query using the query terms and responds with information identifying a set of search results. This information may be formatted as a hypertext markup language (HTML) document that the client device 102 processes in order to display a search engine results page. Using the entered query term, the search engine 104 may execute search queries for information stored on public networks (e.g., the Internet) or private networks (e.g., an intranet server).

In addition to sending the search request to the search engine 104, the client device 102 may also use the entered query term to search for information stored locally on the client device 102, such as a contact database, local files, cached data, historical data, user profile information, configuration settings, or other data, or to query applications that are installed on the client device 102 that have the capability to receive queries. These applications may communicate with other servers instead of the search engine, to obtain results in a similar manner by which the client device 102 communicates with the search engine 104 to obtain results of search queries. The client device 102 may also periodically transmit all or some of the locally stored information, or an index of the locally stored information, to the search engine 104, so that this information may be searched by the search engine 104 during the execution of the requested search query, and may be returned in the results of search queries.

State "A" of FIG. 1 illustrates that the user has requested a search query, by selecting the search box 110 in the user interface 108a. In some embodiments, the intent to request the search query occurs when the user selects a "search" button on the user interface 108, or when the user clicks, taps, or otherwise selects the search box 110 (e.g., Google Desktop Search or toolbar, or a search box in a web browser). Alternatively, where a prefix search is performed on query term entered into the search box 110, the intent to request the search query occurs when the user begins entering one or more characters of the query term into the search box 110.

In the illustrated example, the single character "w" has been entered as a query term in the search box 110. Where a prefix search is executed on query terms entered into the search box 110, the single character "w" may have been entered as the first letter of a longer query term. Alternatively, the user may have entered the single character "w" into the search box and selected a "search" button on the user interface 108. Further alternatively, the user may have spoken a "double-you" sound into a voice interface, then may have spoken a voice command to request the search query. In any case, the client device 102 transmits data 113, including the entered query term "w," to the search engine 104 over a network, and the user interface 108a including the search box 110 is displayed.

The client device 102 and the search engine 104 may be used to generate suggested query terms using the user-entered query term, either on their own, or in combination with each other. The client device 102 or the search engine 104 may each generate suggested query terms after the user has entered a complete query term or phrase into the search box 110, may generate suggested query terms after the user has invoked the search dialogue but before they have entered any text, or, in the case of a prefix search, may generate suggested query terms as the user enters the characters that make up the prefix of the query term or phrase. These suggested query terms may include terms that were previously suggested to and selected by the user or other users in the past.

In addition to executing search queries, the search engine 104 includes a query revision module or application that processes a user-entered query term to generate one or more suggested query terms, using one or more query revision strategies. In one example, a suggested query term may be a term that, after the user enters a few characters of text, the search engine 104 determines the user may have been planning to type. For instance, where the user is using a small keyboard, the search engine 104 may save the user the hassle of entering a long query term or multiple query terms by suggesting multiple query terms for the user to select.

The suggested query terms may also include those terms which, when they were used by other past users of the search engine 104 to execute search queries, generated search results that appeared to the search engine 104 to be more satisfying to those users than search results that were generated using the entered query term. In state "B," with only the letter "w" entered into the search box 110, the suggested query terms generated by the search engine 104 may include "weather," "Walgreens," and "Walmart," "walrus," or other terms.

If the search engine 104 is implementing a prefix search (or "incremental search"), the suggested query terms are those terms that match the text being entered by the user. With a prefix search, the user will find that the suggested query terms become more relevant or accurate as more characters are entered, and as the suggested query terms become progressively more refined. The search engine 104 may generate and provide suggested query terms as the user enters the query term, for example in a drop-down list 116 beneath the search box 110 in user interface 108b.

In an example of a different query revision strategy, when the search engine 104 is itself configured to directly answer certain, special types of queries (e.g., by using query terms "what is the height of mount Everest" to generate, by the search engine 104, a query result of "Elevation: 8,848 meters (29,029 FT)"), the search engine 104 may generate and provide suggested query terms that align the entered query term with the required style, condition or format associated with these types of special queries. For instance, a search engine 104 may suggest the query terms "What is the height of Mount Everest," when the user enters the query term "height of Mount Everest" alone, if the interrogatory term "what is" is required to trigger the search engine 104 to directly answer the user's intended question. In another example, the search engine 104 may suggest the query term "define: lycanthrope" when the user enters the query term "what does lycanthrope mean," "lycanthrope definition," or "what is a werewolf," if the "define:" format is required to trigger the search engine 104 to provide a dictionary definition for an entered query term.

In another example, if a search engine 104 requires the query term "weather" and a location name, in that specific order, to directly answer a query about the current weather at the location, the search engine 104 may suggest the query terms "weather New York" when the user enters the query terms "snow nyc," "weather home," "new york weather," "statue of liberty fog," "weather 10030," et cetera. In the case of "snow nyc," the search engine 104 may generate the suggested query term "weather" as a broader version of the entered partial query term "snow," and may generate the suggested query term "New York" by accessing a table that indicates that the entered partial query term "nyc" is a well known, colloquial or slang abbreviation or way of referring to that city.

In a similar example of another query revision strategy, the search engine may perform a spelling check on the query term "wheather new york," and may generate and provide the suggested query term "weather New York" instead. In yet another example, the search engine 104 may generate the synonymic suggested query term "werewolf movie" based on the use-entered query term "lycanthrope film."

The search engine 104 may generate suggested query terms by comparing the user-entered query term to query terms used by the user in past search engine queries, to past search engine queries of other users, to data indexed at the client device 102 or the search engine 104, to user preference information, or to other data. In state "B," for example, the search engine 104 has generated the suggested query terms "weather," "Walgreens," "Walmart," and "walrus," based on the user-entered query term "w," and has transmitted data 114 that identifies those suggested query terms back to the client device 102. The particular suggested query terms identified by the search engine 104 may have been generated using any number of query revision strategies.

The search engine 104 may generate the suggested query terms based on the user's past activity, or the activity of other users of the search engine 104. The search engine 104 may, for example, recognize the user based on a user profile or a browser cookie, and use that information to match the entered query term with query terms or search results that the user or other users have frequently entered, selected, or found relevant or satisfying in the past. In the illustrated example, the search engine 104 may generate the suggested query terms "weather," "Walmart," "Walgreens," or "walrus," based on the relevance or estimated satisfaction of search results that were obtained using these query terms, by other users in the past.

In addition to or instead of obtaining suggested query terms from the search engine 104, the client device 102 may itself also generate suggested query terms by searching local information (e.g., an index of recently executed local applications or recently used query terms, a database of contacts, or applications on the client device that have registered their capability of being searched with the client device 102). For example, the user may store information about one or more favorite locations, bookmarked or favorite web pages, contacts, or POIs (e.g., libraries, restaurants, previously visited, 'favorited', or tagged locations) in an onboard hard drive, flash memory, or other storage device. In another example, the information about the user's past search or browsing history can also be stored on the client device 102 and then be used to generate suggested query terms. If the intent to request the search has occurred but the user has not entered a query term, the client device 104 may use this local information to suggest query terms that identify the most recently accessed items on the client device 104, the most popular entered query terms on the client device 104, or previously suggested query terms.

In the illustrated example, the client device 102 may, in state "B'," use the query term "w" to identify a local contact in a local database of contacts, "Wally Anderson," and to suggest that contact's name as a suggested query term. Similarly, the client device may use the query term "w" to identify a recently executed or recently installed application, "Wacky Solitaire," and to suggest that application name as a suggested query term. Alternately, "Wacky Solitaire" may have been suggested as a query term by an application running on the client device 102 that had registered itself as being searchable. In addition to the illustrated communication between the client 102 and the server 104, such an application may have used the query term "W" to query a separate server for available software downloads, and may have received the suggested term "Wacky Solitaire," from this separate server.

When the user entered the query terms "weather New York" and requested a search query in the past, the query terms "weather New York" may have been stored in the user's search history, and the term "New York" may have been stored in user preference information or settings. Using this locally information, the client device 102 may determine that the user might intend to repeat the same search query when they entered the query term "w" into the search box 110, and may generate and provide the "weather New York" suggested query term 111. A similar process may be used to generate the suggested query term "Weather 92067." By using locally stored information, suggested query terms may be generated and provided to the user quickly, without any network transmission delays, by relying on prior interactions between the user and the client device 102. Content associated with these previously selected query terms that was once considered live content may be accessed from a cache for display with these terms, while live content is being obtained.

The client device 102 may further generate other suggested query terms by searching local information (e.g., user preferences or recently used query terms) using suggested query terms that have been generated by and received from the search engine 104. For example, the client device 102 may store configuration information or settings, such as the user's home address (e.g., zip code 92067). When the query term "weather" is suggested by the search engine 102, this query term may be aggregated with the user's home address data to form a suggested query term of "weather 92067." In another example, the user may save a list of stock ticker symbols that are of interest to the user. The client device 102 or the search engine 104 may use this information to generate a suggested query term that may then be used to query for and provide the user with a current stock price for those companies.

In an additional example, while the single input character "w" may not be sufficient for the client device 102 to suggest a query term to obtain local weather information, the client device 102 may suggest the query terms "weather New York" or "weather 92067" when the search engine 104 first suggests the query term "weather." In addition to the technique described above, the locations "New York" and "92067" may be identified based on prior "weather" queries that the user has performed in the past, or based on local information stored at the client device 102 (e.g., user preference information, or current location information) that indicates that the user might be interested in "New York" or the location associated with zip code "92067."

The set of query terms suggested by the client device 102 and/or the set of query terms suggested by the search engine 104 are displayed by the client device 102, as illustrated in user interface 108*b*. The different sets of suggested query terms may be merged prior to display, or they may be displayed separately. As shown in the user interface 108*b*, the client device 102 has combined the suggested query terms generated by the client device 102 and the search engine 104, and is displaying the combined list of suggested query terms in a drop-down list 116 beneath the search box 110. Combining the sets of query terms may include deleting duplicate suggested query terms, or prioritizing or ranking certain query terms over other query terms.

It is not necessary to obtain live content, or to attempt to obtain live content, for every suggested query term, although in some implementations an attempt may be made by formulating a live query for all of the suggested query terms. As depicted in state "C," once the suggested query terms have been obtained by the client device 102, a subset of the suggested query terms that may be associated with live content may be selected, where the subset includes all, or less than all of the suggested query terms that have been generated by the client device 102 and/or the search engine 104. Associations between suggested query terms and live content may be registered by or at the search engine 104 and/or by the user of the client device 102.

In one example of selecting suggested query terms for the subset, query terms that include the terms "weather" and a location name or identifier (i.e., "weather New York," and "weather 92067") may be selected to obtain current weather information as live content. Query terms that include the name of a person (i.e., "Wally Anderson") may be selected, to obtain current status or location information for that person as live content. For example, the suggested query term "Wally Anderson" may be recognized by the client device 102 as a contact in a local database, and may be selected as part of the subset.

Furthermore, query terms that include the name of a business (i.e., "Walgreens," and "Walmart") may be selected, to obtain current review information or current stock price information as live content. For example, the search engine 104 may recognize the suggested query term "Walmart" from a database of publicly traded companies, and select that suggested query term as part of the subset. In one alternative approach, to minimize computational expense, no further efforts will be made to obtain live content for other suggested query terms that are not specifically associated with live content (i.e., "Wacky Solitaire," "walrus," and the single word "weather"). Alternatively, "default" processing may occur to obtain live content for these suggested query terms, for example by live querying Wikipedia or an encyclopedia for current information using these suggested query terms. Further alternatively, if live content is not to be obtained for certain query terms, cached content may be obtained from a cache and displayed with these suggested query terms.

The subset of suggested query terms may be at least partly selected based on dynamic information obtained from outside of the search engine 104, such as a third-party server or service. For example, the user may be linked to an online contact manager (e.g., Gmail contacts) or a social networking site (e.g., Facebook, LinkedIn, MySpace). These sites and services may then be queried to determine if a suggested query term (i.e., "Wally Anderson") is a contact, a friend, or friend of a friend, or a person otherwise associated with the user. A result of this query may be used to determine whether the suggested query term should be selected as part of the set or subset of suggested query terms.

In another example of using a third-party server or service to select the subset, the user may be associated with a financial information or management service, such as Google Finance, Bloomberg.com, Quicken.com, or other site where the user can configure banking, savings, credit, or investment information. The client device 102 or the search engine 104 may compare suggested query terms against information associated with the user's accounts on the financial information or management services to select certain of these suggested query terms as part of the subset. For example, information stored on a third-party financial information or management service may indicate that the user has an account with "MasterCard" and owns stock in "Masco Corp." (e.g., ticker name "MAS"). When the user enters the query term "mas" into a search box, the search engine 104 may suggest the query terms "MasterCard," "Masco Corp." and "Massey Ferguson," but may only select "MasterCard," and "Masco Corp." as part of the subset since the information stored on the third-party financial information or management service does not reflect a connection between the user and "Massey Ferguson."

Live content is obtained for the subset of suggested query terms by providing data that identifies the selected query terms in the subset, to the search engine 104. Live content is information that is obtained at or shortly after the time when the suggested query terms are generated by the search engine. The live content be information that is associated with a suggested query term. The live content may be data whose value is not pre-indexed or otherwise stored by the search engine when the suggested query term is generated, or shortly thereafter (e.g., within one second, or thirty seconds of generating the suggested query term). Rather, rather live content may include information that is fetched from a third-party content provider, or dynamically updated at the search engine, at a time after the user has entered the query term.

Obtaining live content requires a device or system to perform a live query or dynamic update in response or in parallel with to generating the suggested query term. Accordingly it is different than content, such as cached content, that was current at the time of the last visit or crawl by the search engine, unless that visit or crawl occurred after the user-entered query term is received and the suggested query term is generated. For instance, the search engine 104 may periodically visit a weather content provider and store the weather information for a particular location as 'most recent' weather information. When a suggested query term is generated relating to weather information and that particular location, the stored, 'most recent' weather information would not be considered live information if it were obtained before the suggested query term was generated.

If the search engine 104 itself selects the subset of suggested query terms, the process of obtaining live content for those query terms may commence immediately, without exchanging data that identifies the subset to the client device 102. When the client device 102 selects the subset of suggested query terms, in whole or in part, information identifying the subset is transmitted from the client device 102 to the search engine 104, to initiate the process for obtaining live content.

In an example implementation where an attempt is made to obtain live content for all of the suggested query terms, it would not be necessary to select or to identify any subset of the suggested query terms by the client device 102 or the search engine 104. The example framework illustrated in FIG. 1 assumes, however, that the subset of suggested query terms is selected at least in part by the client device 102. Under this assumption, and as shown in state "C," data 118 that identifies the query terms in the subset of suggested query terms is transmitted from the client device 102 to the search engine 104 to perform a live query to obtain live content. The data 118 may include other information as well, including, for example, the current location of the client device 102 or information identifying a user of the client device 102, that might be useful in obtaining relevant live content.

The live content generated for a particular selected query term may relate to a current circumstance or state of the user of the client device 102. Where no other location information is suggested by a user's search history or settings, for instance, the current location of the client device 102 may be used obtain the live content, such as by using the suggested query term "weather" to determine the current weather at the current location, or by using the suggested term "Walgreens" to determine a current distance to a closest "Walgreens" store. Accordingly, in addition to identifying particular suggested query terms of the subset, the local device may also generate real-time data, and send this real-time data to the server 104 to be used in the live query to obtain live content. In the illustrated example, for instance, the client device may determine its current location ("45.116816 lat., 93.433085 lon.") from cellular tower or Wi-Fi triangulation, from an onboard GPS receiver, or from user input, and may include this information in the data 118 that is sent to the search engine 104.

Once the suggested query terms have been generated and provided on the dropdown list 116 of the user interface 108b, it may take an additional amount of time to identify the subset, to communicate the identity of the suggested query terms of the subset between the client device 102 and the search engine 104, to perform a live query to obtain the live content by the search engine 104, and to provide the live content to the client device 102 for display. As an indicator that an attempt is being made to obtain live content and that live content may be provided on the user interface 108 in a short period of time, cached content and/or an animated spiraling arrow 120 may be displayed adjacent to the suggested query terms of the subset.

The spiraling arrow 120 may indicate to the user of the client device 102 that live content is being obtained and will be provided shortly, allowing the user to decide whether to wait to see the live content, or to select the link to the suggested query term instead of waiting for the live content (i.e., if the user is aware of the type of live content that will be displayed, and is not interested in such content). The spiraling arrow 120 is removed when the live content is displayed, or when the client device 102 or the search engine 104 determine that no live content will be obtained for a particular suggested query term (e.g., after a predetermined period of time, or after a null value is received for the live content).

Although the visual cue used in this illustrated example is an animated spiraling arrow, in other examples this visual cue may be static, and may be an hourglass or some other progress indicator. Additionally, the progress to obtain live content may be visually cued by a change in the size, font, color, background, or any other characteristic of the text or graphic used to identify the subset of suggested query terms. For example, member query terms of the subset may be italicized or bolded to indicate that they have been, or are going to be, transmitted 118 to the search engine 104 to perform a live query. In other examples, no visual cues are shown.

The suggested query terms may include terms that the user has previously selected during a previous query, and that may have live content that has been previously obtained and is now cached on the client device 102 or the server 104. If the user has previously selected the suggested query term "Walmart," live content may have been obtained at that time that indicates that the share price of Walmart stock was $33 per share. When the search engine 104 generates the suggested query term "Walmart" again, this time in response to the user-entered query term "w," that content is no longer considered to be live content, but rather is considered to be cached content. This cached content may be displayed adjacent to the suggested query term, instead of or in addition to any other visual cue, while live content is being obtained. For instance, in state "B," cached content 117 ("$33/shr") is displayed next to the suggested query term "Walmart," to show some data instantaneously to the user while current data is being obtained. The cached content 117 may be formatted to have a different appearance than live content, for example by using a different font or color, so that the user does not confuse this content with live content.

In state "D," the search engine 104 obtains live content for one or more of the suggested query terms of the subset, using the suggested query terms themselves to determine a type of live query to perform to obtain the live content, the target of the live query, and the query terms to use to formulate the live query. As used by the specification, a "live query" is a query to obtain live content that occurs after a suggested query term is generated.

In several examples of live query types, if the suggested query term includes the terms "weather' and a location (i.e., "weather New York," and "weather 92067") the search engine 104 may formulate a live query for execution by a weather service, using the location as a query term, to obtain a current weather forecast at the location. If the suggested query term includes the name of a person (i.e., "Wally Anderson"), the search engine 104 may formulate a live query for execution by a social network provider, using the name as a query term, to obtain a current status (e.g., Facebook status, latest tweet, or chat availability) or location for that person. If the query term includes the name of a business (i.e., "Walgreens," and "Walmart"), the search engine 104 may formulate a live query for execution by a business information service, using the business name as a query term, to obtain current review information or current stock price information.

In other examples of live query types, if the suggested query term includes the name, title or other identifier of a television show, song, movie or other media content, the search engine 104 may formulate a live query for execution by a schedule server (e.g., tvguide.com), using the name or title as a query term to obtain local show times that may be associated with the name. If the suggested query term includes the name of a sports team or sports player, the search engine 104 may formulate a live query for execution by a sports news service (e.g., espn.com, nfl.com) using the name as a query term, to obtain the latest scores or statistics associated with the team or player. If the suggested query term includes the name of a bank or account provider with whom the user has a business relationship, the search engine 104 may formulate a live query for execution by the bank's or the account provider's server using the account information of the user to obtain the user's current account balances.

The user can also indicate that certain types of live content are to be obtained for certain types of suggested query terms, by specifying type of live query to perform to obtain the live content, the target of the query, and the query terms to use to formulate the query. For instance, the user may set, in user preferences stored on the client device 102 or the search engine 104, that the query terms "gas" or "fuel" are to be used to obtain local fuel prices near the user's current location, by specifying a target of the live query (e.g., gaspricewatch.com), the query terms to formulate the live query (e.g., "lowest price" and zip code of current location), and the type of information to be presented as the live content (e.g., a lowest local price metric).

In the example illustrated in FIG. 1, the suggested query terms "weather New York" and "weather 92067" are used by the search engine 104 to live query a weather service using the query terms "New York" and "92067," to obtain the live content "55°, partly cloudy," and "76°, sunny," representing the current weather in New York and at zip code 92067, respectively, at a time when (or shortly after) those suggested query terms were generated. The suggested query terms "Walgreens" and "Walmart" are used by the search engine 104 to live query a business information service, using the business names "Walgreens" and "Walmart" as a query terms, to obtain current stock price information at a time when (or shortly after) those suggested query terms were generated. In the case of "Walgreens," no stock price information was available, and the business information service returned a current stock price of "<none>." In the case of "Walmart," the business information service returned a current stock price of "$38 per share." The suggested query term "Wally Anderson" was used by the search engine 104 to query a social network, which returned a response to the search engine 104 indicating that the status of "Wally Anderson," at the time (or shortly after) that suggested query term was generated, is "away."

Finally, while FIG. 1 illustrates using the search engine 104 to formulate live queries to obtain live content using suggested query terms, in other example implementations the client device formulates one or more of the live queries and obtains live content without involving the search engine 104, or in conjunction with or in addition to the live queries formulated by the search engine 104.

As illustrated in state "E," the live content that is obtained for the suggested query terms is included or identified in data 122 that is sent from the search engine 104 to the client device 102. The data 122 may be transmitted in one message, for example after all of the live content for all of the suggested query terms of the subset are obtained, or the data may be transmitted in multiple messages after the live content is obtained for each suggested query term or for groups of the suggested query terms. The data may include the live content itself, or the search engine 104 may process the live content to identify and transmit information relating to the live content, such as an icon.

The client device 102 in turn may process the live content and, for each respective suggested query term, remove the associated spiraling arrow 120, and display information relating to the live content on the user interface 108e, adjacent to or instead of the suggested query term itself. In processing the live content, the client device 102 may select certain parts of the live content, or icons representing information included in the live content, for display. If no live content is available for a suggested query term in the subset, the associated spiraling arrow is removed to indicate to the user that no live content is forthcoming. For example, the client device 102 removes the spiraling arrow adjacent to the "Walgreens" suggested query term based on receiving the data 122, that indicates that no live content is available for that term, or based on waiting a predetermined amount of time (e.g., five seconds, thirty seconds, one minute) without receiving any live content from the search engine 104.

As described above, the live content obtained by the search engine 104 for the "weather New York" suggested query term 111 includes the information "55°, partly cloudy." The client device 102 or the search engine 104 may process this information and select a representative icon (e.g., a sun for sunny weather, a snowflake when it is snowing, a cloud when it is cloudy) for display. When the search engine 104 selects an icon, the icon or the live content alone may be transmitted to the client device 102 for display, or the icon and the live content may both be transmitted.

In another example, instead of displaying information relating to the live content adjacent to the suggested query term, the live content may be presented as a balloon dialog or pop up dialog box when the user hovers a pointer over a suggested query term. Regardless of which approach is used to display the live content, it is anticipated that many users will find the information that they intended to seek within the drop-down list 116 itself, without taking any further action to select a suggested query term or initiate a further search.

As illustrated in state "F," regardless of whether live content is displayed or not, the user may select a particular suggested query term in the drop-down list 116, to invoke functionality associated with the particular suggested query term. The selection of a suggested query term may cause the client device 102 to send the selected query term to the search engine 104 or another server, to request that a search query be performed using the selected query term. Alternatively, where other information such as a uniform resource locator (URL) is stored for a particular query term, the client device 102 may transmit the URL associated with the particular query term to the search engine 104. For instance, if the URL "www.walgreens.com" is stored on the client device 102 for the suggested query term "Walgreens," the selection of a link 118 to the query term "Walgreens," may result in the client device 102 sending an HTTP request 130 that identifies this URL to the search engine 104 (or another server), to request a web page.

If the user had selected a suggested query term that included live content, the client device 102 may locally store that suggested query term as a shortcut to live content that the user has been interested in before. In this regard, the next time that the user initiates a search dialogue on the client device 102, these shortcuts, including updated live content, may be displayed below the search box 110, without requiring the user to enter any text at all. As such, by saving shortcuts to live content, the search box 110 becomes a type of ad-hoc widget, capable of displaying live content for any number of subjects, with little or no typing. Once the user does start to type prefixes that match the suggested query terms associated with a shortcut, that live content would be ranked highly within the drop-down list beneath the search box 110.

The functionality that is invoked when the user makes a selection at the client device may be different depending on whether the user selects the suggested query term or whether they select the live content. For instance, if the user selects a link to the terms "Mr. Anderson" on the user interface 108e, the client device 102 may obtain and display locally stored contact information. If the user selects a link to the terms "is Away" on the user interface 108e, the client device may obtain and display a social network page for the identified contact.

Figure 2:
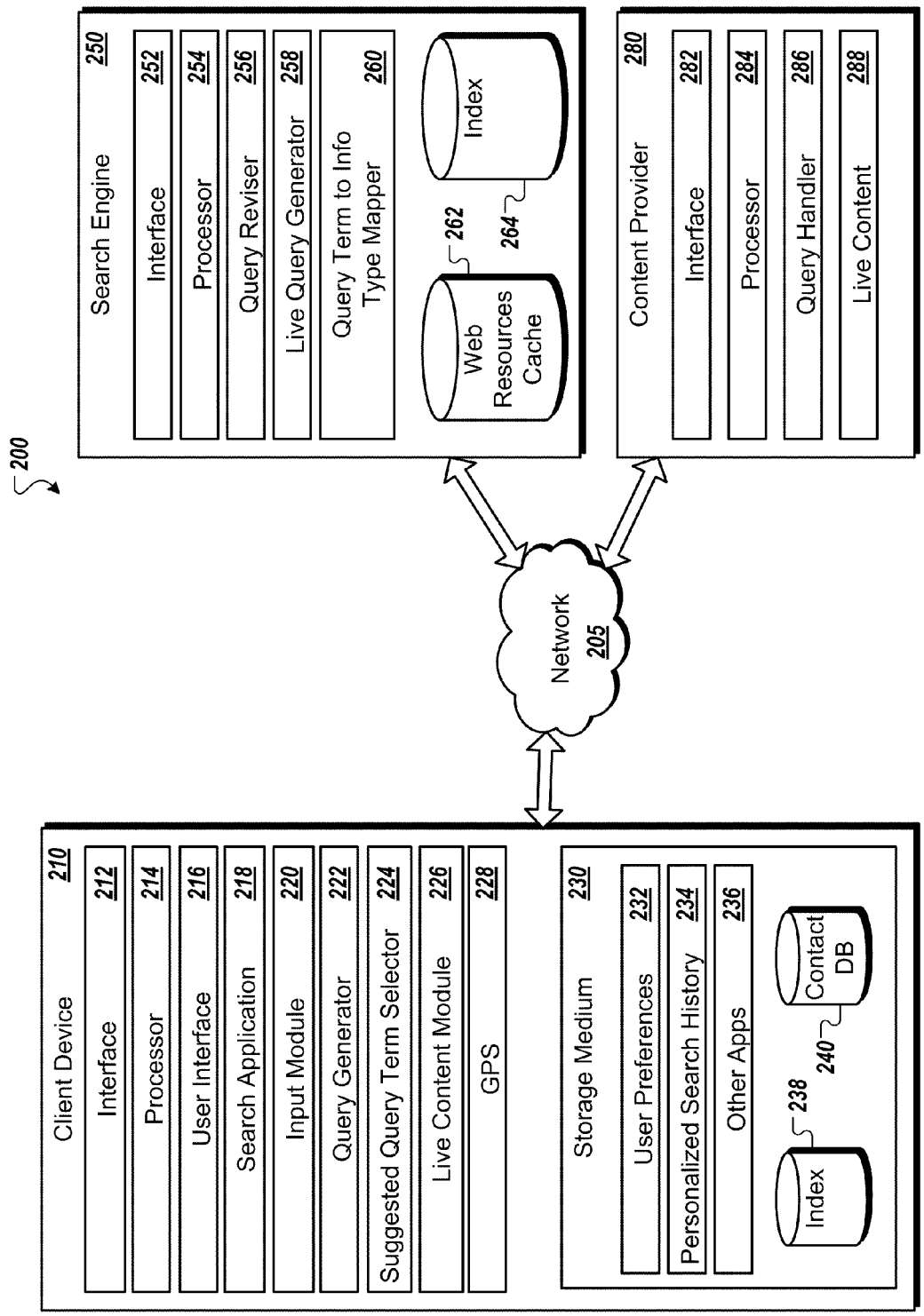
FIGS. 2 and 7 are block diagrams of example systems.

FIG. 2 is a block diagram of an example information search system 200 that is adapted to provide real-time feedback. The system 200 includes a network 205, that may be a public or private network. The network 205 communicably connects a client device 210, a search engine 250, and/or a content provider 280.

In some implementations, the client device 210 may be a mobile device such as a cellular telephone, a portable computer, personal computer, a PDA, a netbook, a navigational system, an automotive informatics system, or other mobile or non-mobile system. In some implementations, the client device 210 may be a substantially stationary system, such as a desktop computer. In some implementations, the client device may be the client device 102 of FIG. 1.

The client device 210 includes an interface 212. In some implementations, the interface 212 may be a network interface, a wireless communications module, a communications port, or other module that may communicatively connect the client device to the network 205. A processor 214 is included to execute instructions and other computer code, such as those included in a user interface 216, a search application 218, an input module 220, a query generator 222, a suggested query term selector 224, a live content module 226, or other software modules that may be included in the client device 210.

The user interface 216 provides buttons, input boxes, controls, dialogs, and other elements that a user may manipulate and view to interact with processes executing on the client device 210, such as the search application 218. In some implementations, the user interface 216 may be the user interface 108 of FIG. 1. The search application 218 is a software application that is executed by the processor 214 to provide the user with functions related to searching for information located on the client device 210, or on the search engine 250. The input module 220 is included to provide the user with a mechanism to invoke search dialogues, to input query terms, or to select suggested query terms.

The query generator 222 is used by the client device 210 to obtain live content using suggested search terms. The suggested query term selector 224 is included to determine which query terms or suggested query terms are to be selected for a live query (e.g., determining query terms that may be associated with live content). The live content module 226 is included to perform functions related to submitting the query terms that have been selected for live queries to the server 250, receiving live content related to the submitted query terms, and associating the query terms with the live content received from the server 250.

A GPS module 228 is included to receive signals from a global positioning system and to determine the client device's 210 current geographical location. In some implementations, this location information may be used by the live content module 226 or other processes to associate query terms with the physical location of the client device 210.

The client device 210 includes a storage medium 230 for storing electronic information such as a set of user preferences 232, a personalized search history 234, or one or more other applications 236. If the other applications 236 are capable of being searched, they may register this capability with the search application 218 so that they are searched and return results when query terms are input. Accordingly, the other applications 236 may also include their own index that they search through in order to provide suggested query terms.

These other applications 236 may also be server/network based, and not necessarily local only to the client device. For example, a bookstore application on the client device 210 may search a catalogue of books indexed on a separate server when the user enters a query term into a search box, and may return a book that matches the entered term as a suggested query term. Furthermore, working in concert, the bookstore application and separate server may return live content regarding this suggested query term, such as a current price, number of copies currently sold, et cetera.

In some implementations, the storage medium 230 may be a read-only memory, a static random access memory (e.g., flash memory), a dynamic random access memory, a magnetic storage medium (e.g., hard drive, floppy disk), and optical drive, or combinations of these or other forms of digital information storage media. The user preferences 232 are settings indicated by the user. For example, the user may configure a "home" location or locale (e.g., an address, a zip code, or locale setting) that is stored as a one of the user preferences 232. In some implementations the client device 210 may display suggested query terms for the user's present location and suggested query terms for the user's preferred locations as well. For example, in a scenario where the user has traveled to another city and enters the query term "weather," the client device 210 may display not only suggested query terms (e.g., the weather conditions) at the position determined by the GPS 228, but for his or her "home" location as well. Other examples of the user preferences 232 may include information that identifies persons, places, events, or other things (e.g., sports teams, television shows), companies, events, or POIs (e.g., ATMs, antique stores, hospitals). In some implementations, the user preferences 232 may include information about the kinds of live content that the user would like to see. For example, the user preferences 232 may indicate that the user is interested in seeing current gasoline prices, but not stock prices, included in suggested query terms.

The personalized search history 234 includes information relating to the user's past activities or interactions with the client device 210. In some implementations, the personalized search history 234 may store a list of search queries that the user has entered, or a list of suggested query terms that the user has selected. In some implementations, the personalized search history 234 may include a list of recently accessed contacts, browsed web pages, recently accessed local files, or recently used local applications such as the other applications 236.

The storage medium 230 also stores an index 238 and a contact database 240. In some implementations, the index 238 may be structured data that can be used to increase the speed with which information queries and record accesses are performed. For example, an individual contact record may include multiple addresses, electronic images, attached or embedded documents, or other data that may be unlikely to be searched upon. The size of each of these records or their structure may slow the process of reading their content. By creating an index of searchable data, information search speeds may be increased. For example, the index may include the filenames and metadata associated with JPEG files (e.g., date stamps, geo-tags, shutter speed) or MP3 files (e.g., song name, artist, album), but not their actual image or audio contents. Contact records, electronic files, or other information sources may be indexed to create a repository of information that the client device's 210 applications and modules may use to efficiently locate information in to storage medium 230.

The contact database 240 is a collection of data records that describe persons, places, or businesses. For example, in an embodiment of the client device 210 as a cellular telephone, the contact database 240 may the phone's phone book or contact list. In an embodiment of a desktop computer, the contact database 240 may be the contact list associated with an email program (e.g., Microsoft Outlook, Lotus Notes).

In general, the search engine 250 provides information search services to users through devices such as the client device 210. The search engine 250 analyzes information from sources such as the content provider 280 and indexes the information such that it can be efficiently searched and identified when needed. In some implementations, the search engine may be the search engine 104 of FIG. 1. In some implementations, the search engine may be an Internet search provider such as the Google search engine, the Microsoft Bing search engine, the Yahoo search engine, or other such services.

The search engine 250 includes an interface 252. In some implementations, the interface 252 may be a network interface, a wireless communications module, a communications port, or other module that may communicatively connect the client device to the network 205. A processor 254 is included to execute instructions and other computer codes, such as those included in a query reviser 256, a query generator 258, a query term to information type mapper 260.

The query reviser 256 is a system that takes input query terms and prepares suggested query revisions, refinements, reformulations, spelling corrections, prefix searches, and other functions that can modify a user's search query to possibly increase the probability that the search engine 250 will find what the user intended to look for. For example, a misspelled search term may be less likely to occur in an index 264 than the correct spelling, and therefore may reduce the chances of finding the correct information. The query reviser 256 may detect the misspelling, and offer a corrected spelling as at least part of a suggested query term. In another example, the user may wish to search for a dog kennel using the query terms "Doberman lodging near Brownsdale, Minn.," which may provide only a subset of the kennels in the area (e.g., kennels may not generally cater to only one breed). The query reviser 256 may detect query terms that may be generalized, and reformulate the search query to suggest a broader, and therefore possibly more productive, search query. For example, the term "Doberman" may be abstracted to the term "dog," which in turn may prompt the query reviser 256 to suggest the synonymic term "kennel" for "lodging," to produce a suggested query term of "dog kennel near Brownsdale, Minn."

The live query generator 258 is used by the search engine 250 to obtain live content based on data provided by the query term to information type mapper 260. The query term to information type mapper 260 specifies what types of live content are to be sought for various types of suggested query terms. For example, some query terms may be identified as person names, and may generally be associated with social network information (e.g., status). In another example, some query terms may be identified as place names or coordinates, and may generally be associated with distances, weather conditions, or distances, to name a few.

In some implementations, the query term to information type mapper 260 and query reviser 256 may work cooperatively to suggest query terms. For example, a user in Denver may initiate a query on the term "skiing." The query reviser 256 may revise this query to "ski resorts" or "snow conditions," while the query term to information type mapper 260 may associate these some or all of these terms with one or more information types such as distances to nearby ski resorts, as well as weather conditions or snow depths at those locations. In the present example of the query term "skiing," the search engine 250 may respond with suggested query terms of "Iron Horse Resort, 65 mi, 28 deg F., 66 in" and "Breckenridge, 82 mi, 22 deg F., 102 in."

The content provider 280 provides information that is accessible through the network 205. In some examples, the content provider 280 can be an public or private web server, a web service, file share, or other repository of information that may be accessed through the network 205. In some implementations, the content provider 280 may be a provider of live content, such as weather news, financial information, sports news, social network updates, movie schedules, or other dynamic data.

The content provider includes an interface 282. In some implementations, the interface 282 may be a network interface, a wireless communications module, a communications port, or other module that may communicatively connect the client device to the network 205. A processor 284 is included to execute instructions and other computer codes, such as those included in a query handler 286. The query handler 286 receives and provides responses to queries from devices communicating through the network 205, such as HTTP "GET" requests from the client device 210 and the search engine 250.

The content provider 280 stores or generates live content 288. In some implementations, the live content 288 may be information that changes over time, such sports scores, fuel prices, weather conditions, stock prices, show times, personal statuses, or other types of dynamic data. In some examples, the query handler 286 may respond to requests from the client device 210 or the search engine 250 by including some or all of the live content 288 in the response. For example, the live content 288 may be provided in association with suggested query terms and presented to the user on the user interface 216.

Figure 3:
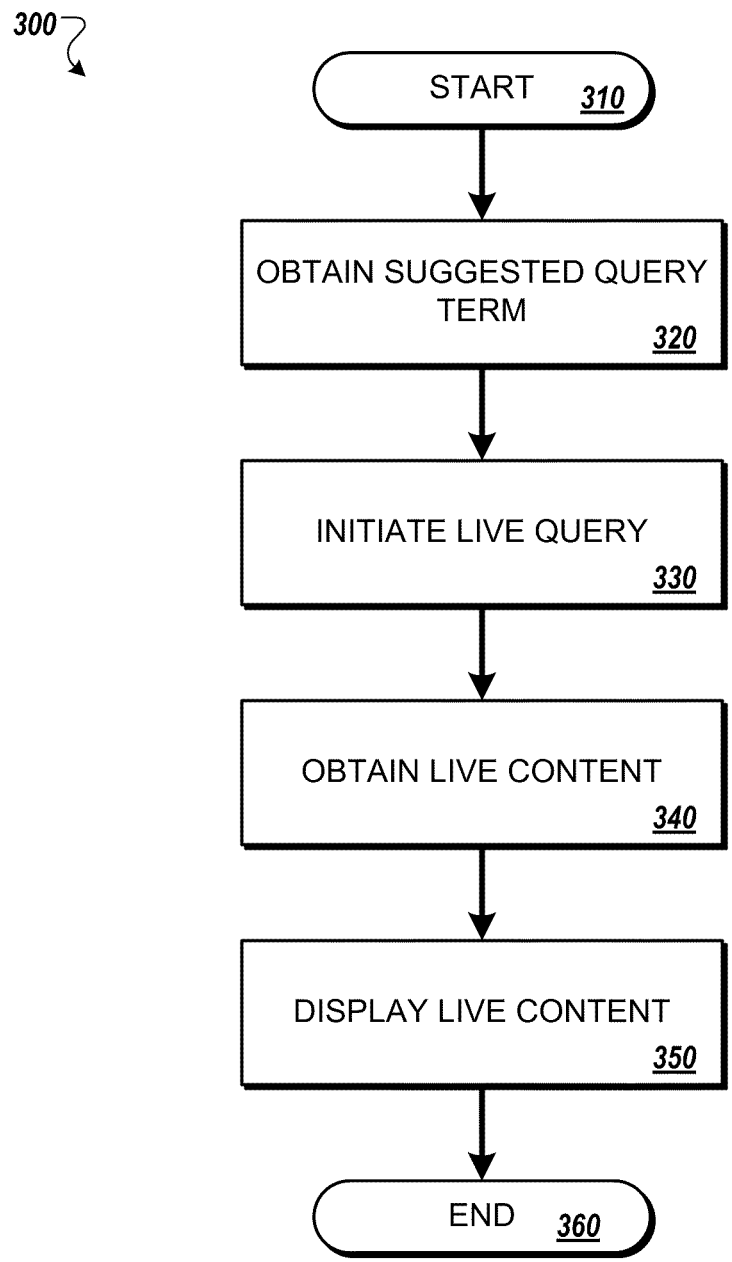
FIGS. 3 and 4 are a flow diagrams of example processes.
Figure 4:
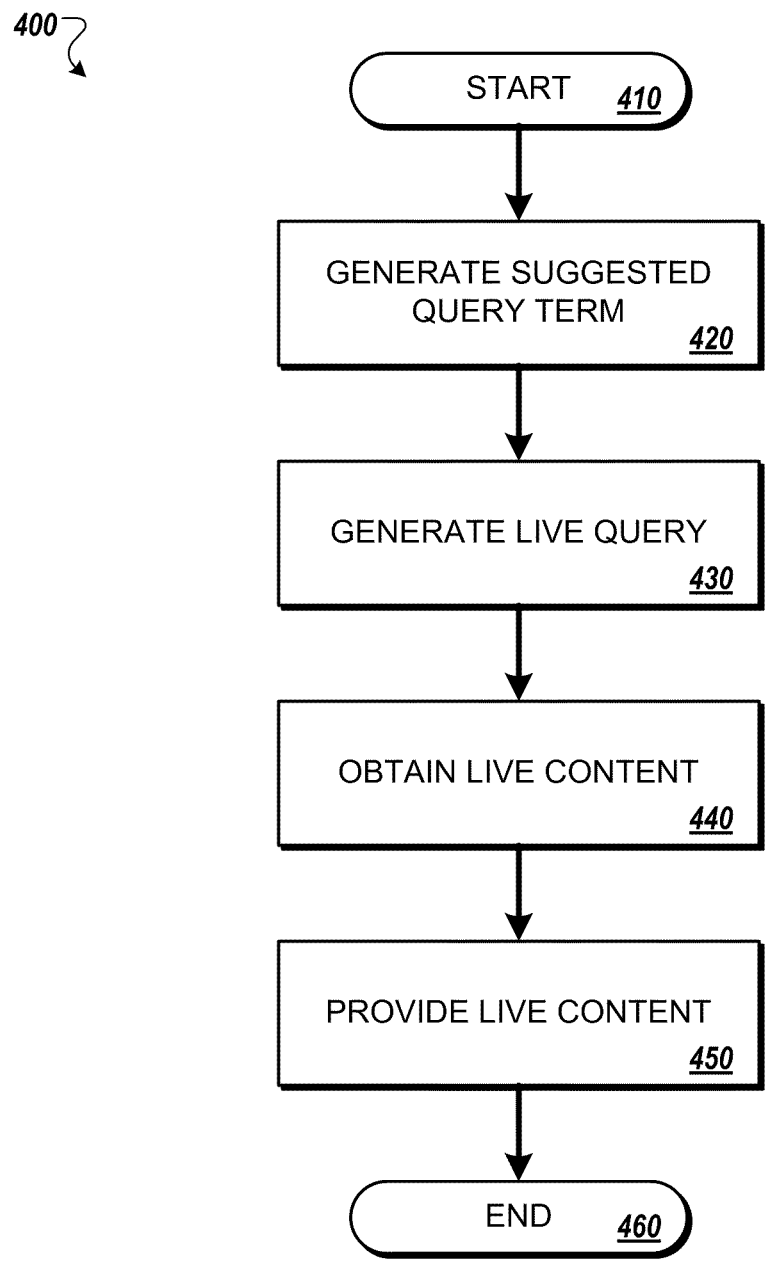

FIGS. 3 and 4 are a flow diagrams of example processes 300 and 400 for obtaining and providing live content. The process 300 may be performed by the client device 102 of FIG. 1, or the client device 210 of FIG. 2. The process 400 may be performed by the search engine 104 or the search engine 250. Generally speaking, instead of merely generating and providing suggested query terms or other static content alone, the processes 300 and 400 operate to obtain and provide live content regarding a person, place, event or other thing referred to by the suggested query terms, in real-time or near real-time to generating the suggested query terms themselves.

Once live content is obtained, the processes 300 and 400 operate to present the live content the user (or to provide the live content for presentation to a user) instead of or in addition to presenting a suggested query terms themselves. For example, responsive to generating the suggested query term, "weather New York," the processes 300 and 400 may automatically perform a query to determine the weather information for New York, current at or shortly after a time when the suggested query term was generated, and may provide this current weather information to the user with the suggested query term. This live content may include text data (e.g., a three digit current temperature reading, or an XML document that includes current weather information) or the live content may include other types of data (e.g., an image or an icon that suggests the state of the current weather, or a sound file of a spoken weather report).

Briefly, the process 300 includes the actions of obtaining a suggested query term by a client device, initiating a query to obtain live content relating to the suggested query term, obtaining the live content responsive to obtaining the suggested query term, and displaying the live content on a user interface of the client device. In further detail, when the process 300 begins (310), the client device obtains a suggested query term (320). Obtaining the suggested query term may include generating the suggested query term at the client device, or to receiving information identifying the suggested query term from another entity, such as a search engine.

When a user enters a query term into a search box, a search engine may respond by generating and providing suggested query terms using any number of query revision strategies. In one example, a suggested query term may be a term which, when it was used by other past users of the search engine to execute a search query, generated a search result that was more satisfying to those users than a search result that was generated using the entered query term. In other examples, the suggested query terms may be a term that the user might have intended to enter, or would have entered to obtain a desired search result had the user either been more experienced with using the search engine.

The client device and the search engine may be used to generate suggested query terms using the user-entered query term, either on their own, or in combination with each other. The client device or the search engine may each generate suggested query terms after the user has entered a complete query term or phrase into a search box, may generate suggested query terms after the user has invoked the search dialogue but before they have entered any text, or, in the case of a prefix search, may generate suggested query terms as the user enters the characters that make up the prefix of the query term or phrase.

Suggested query terms may be generated by the client device or the server without requiring the user to enter query terms into the search box. For instance, the client device may locally store suggested query term that have been previously selected by the user as shortcuts to live content. When the user initiates a search dialogue on the client device, these shortcuts, including updated live content, may be automatically displayed adjacent to the search box. If the user does start to type prefixes that match suggested query terms that have been previously selected by the user, live content associated with those suggested query terms may be prominently displayed near the search box, for example in a drop-down list beneath the search box.

In some implementations, the suggested query term is generated based upon a user-input query term. In some implementations, the suggestion may be based on an expansion, abstraction, refinement, rearrangement, or other modification of the user-input query term. For example, for the user-input query term of "plane," suggested query terms such as "aircraft" and "woodworking tools" may be generated. In some implementations, the suggestion may be based on a user's preferences, location, past search activity, or, personalized search history. In other implementations, the suggested query terms may represent those terms which, when used by other past users of the search engine to execute search queries, generated search results that appear to the search engine to be satisfying to the other past users.

The suggested query terms may be generated as HTML, XML, text, binary, or other form of electronic code. The client device may display the suggested query term in a list of suggested query terms. For example, the suggested query terms may be displayed in a drop-down list, pop-up box, or other user interface element that can display a list or collection of character strings.

In addition to obtaining the suggested query terms, the client device or the server may obtain cached content that may be associated with the query terms. For example, the suggested query terms may include terms that the user has previously selected during a previous query, and that may have live content that has been previously obtained and is now cached. When a previously suggested query term is again suggested, cached content associated with that query term may be displayed adjacent to the suggested query term, instead of or in addition to any other visual cue, while live content is being obtained. In doing so, some data is shown instantaneously to the user while live content is being obtained. The cached content may be formatted to have a different appearance than live content, for example by using a different font or color, so that the user does not confuse this content with live content.

In response to obtaining the suggested query terms, a live query is initiated 330. Initiating a live query may involve formulating a live query for execution, or to communicating a signal to another entity (e.g., the search engine) to cause the other entity to formulate the live query for execution.

The client device may determine whether a suggested query term is to be used to initiate a live query. For example, the suggested query term may be identified as a person, place, business, event, or other thing that is associated with live content. When the live query is initiated, a visual cue may be displayed near the suggested query term to indicate that an attempt is being made to obtain live content. For example, an hourglass symbol, spiraling arrows, a spinning gear, or other static or animated image that symbolizes an operation in progress may be displayed in association with the suggested query term.

Live content is obtained (340) for one or more of the suggested query terms, using the suggested query terms themselves to determine a type of live query to perform to obtain the live content, the target of the live query, and the query terms to use to formulate the live query. For example, live content, such as current weather report information, latest social network update information, current stock price information, or other types of dynamic information may be received from the search engine or from another content provider. Obtaining the live content may include generating the live content, or to receiving information identifying the live content from a content provider, either directly or through another entity (e.g., the search entity).

In several examples of live query types, if the suggested query term includes the terms "weather" and a location, the search engine or the client device may formulate a live query for execution by a weather service, using the location as a query term, to obtain a current weather forecast at the location. If the suggested query term includes the name of a person, the search engine or the client device may formulate a live query for execution by a social network provider, using the name as a query term, to obtain a current status or location for that person. If the query term includes the name of a business, the search engine or the client device may formulate a live query for execution by a business information service, using the business name as a query term, to obtain current review information or current stock price information. If the suggested query term includes the name, title or other identifier of a television show, song, movie or other media content, the search engine or the client device may formulate a live query for execution by a schedule server, using the name or title as a query term to obtain local show times that may be associated with the name. If the suggested query term includes the name of a sports team, league, or sports player, the search engine or the client device may formulate a live query for execution by a sports news service (e.g., espn.com, nfl.com) using the name as a query term, to obtain the latest scores or statistics associated with the team or player. If the suggested query term includes the name of a bank or account provider with whom the user has a business relationship, the search engine or the client device may formulate a live query for execution by the bank's or the account provider's server using the account information of the user to obtain the user's current account balances.

Once obtained, the client device displays the live content to the user (350), thereby ending the process 300 (360). The live content may be displayed as raw data, or as an image, symbol, or an icon proximal to the corresponding suggested query term. For example, cloudy weather conditions may be displayed as a cloud image on the same line as a suggested query term for a location. In another example, a stock price may be displayed as a character string when the user pauses a pointer over a suggested query term for a company name. If the search engine selects an icon, the icon or the live content alone may be transmitted to the client device for display, or the icon and the live content may both be transmitted.

In another example, instead of displaying information relating to the live content adjacent to the suggested query term, the live content may be presented as a balloon dialog or pop up dialog box when the user hovers a pointer over a suggested query term. Regardless of which approach is used to display the live content, it is anticipated that many users will find the information that they intended to seek within the drop-down list itself, without taking any further action to select a suggested query term or initiate a further search.

In some implementations, the live content may be displayed by updating the visual representation of the suggested query term. For example, the suggested query term may be displayed by replacing a symbol used to indicate pending update (e.g., an hourglass) with the live content. In some implementations, the entire suggested query term, as displayed, may be replaced with an updated, and possibly revised, suggested query term that includes the live content for display.

The user may select a suggested query term or live content that is displayed on the user interface, and the client device may locally store the suggested query term as a shortcut to live content that the user has been interested in before. In this regard, the next time that the user initiates a search dialogue on the client device, these shortcuts, including updated live content, may be displayed below the search box, without requiring the user to enter any text at all. As such, by saving shortcuts to live content, the search box becomes a type of ad-hoc widget, capable of displaying live content for any number of subjects, with little or no typing. Once the user does start to type prefixes that match the suggested query terms associated with a shortcut, that live content would be ranked highly within the drop-down list beneath the search box.

Turning to FIG. 4, the process 400 includes the actions of generating a suggested query term by a search engine, executing a query to obtain live content relating to the suggested query term, obtaining the live content responsive to generating the suggested query term, and providing the live content to a client device. When the process 400 begins (410), a suggested query term is generated (420). The suggested query terms generated by the search engine may include those terms which, when they were used by other past users of the search engine to execute search queries, generated search results that appeared to the search engine to be more satisfying to those users than search results that were generated using the entered query term.

Figure 5A:
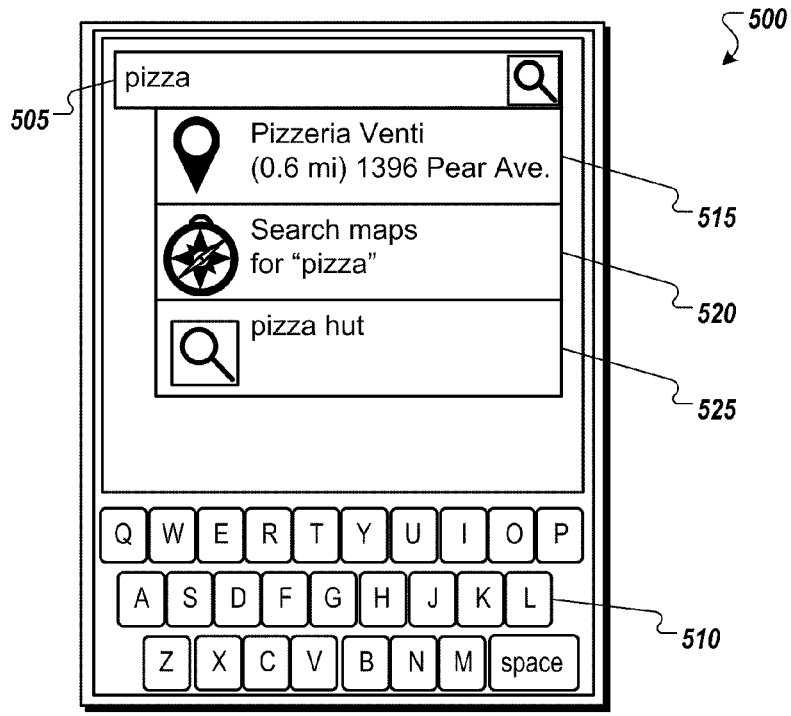
Figure 5B:
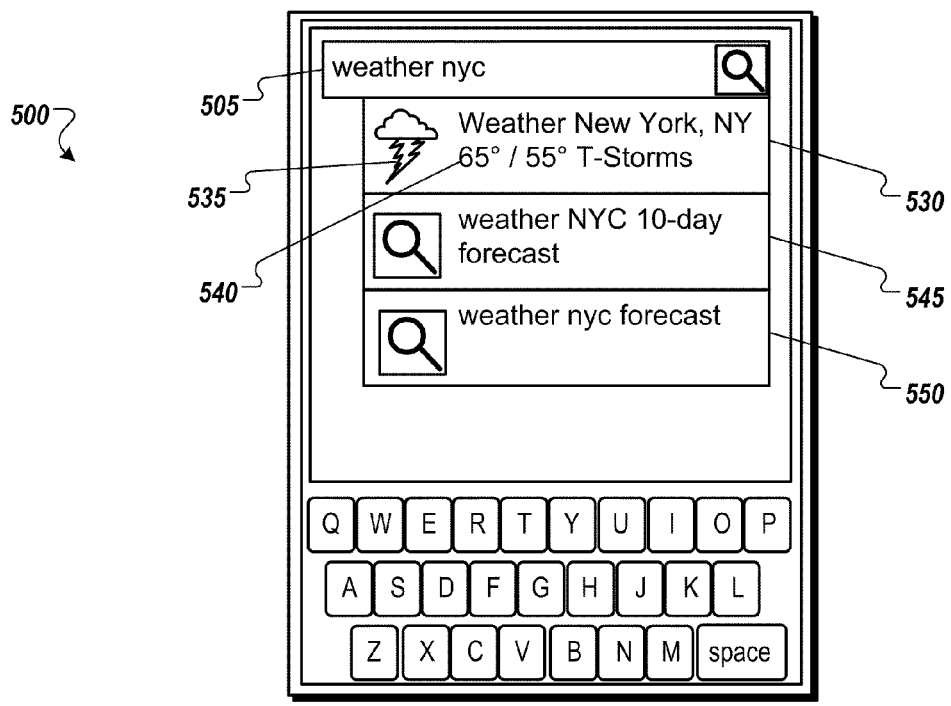
Figure 5C:
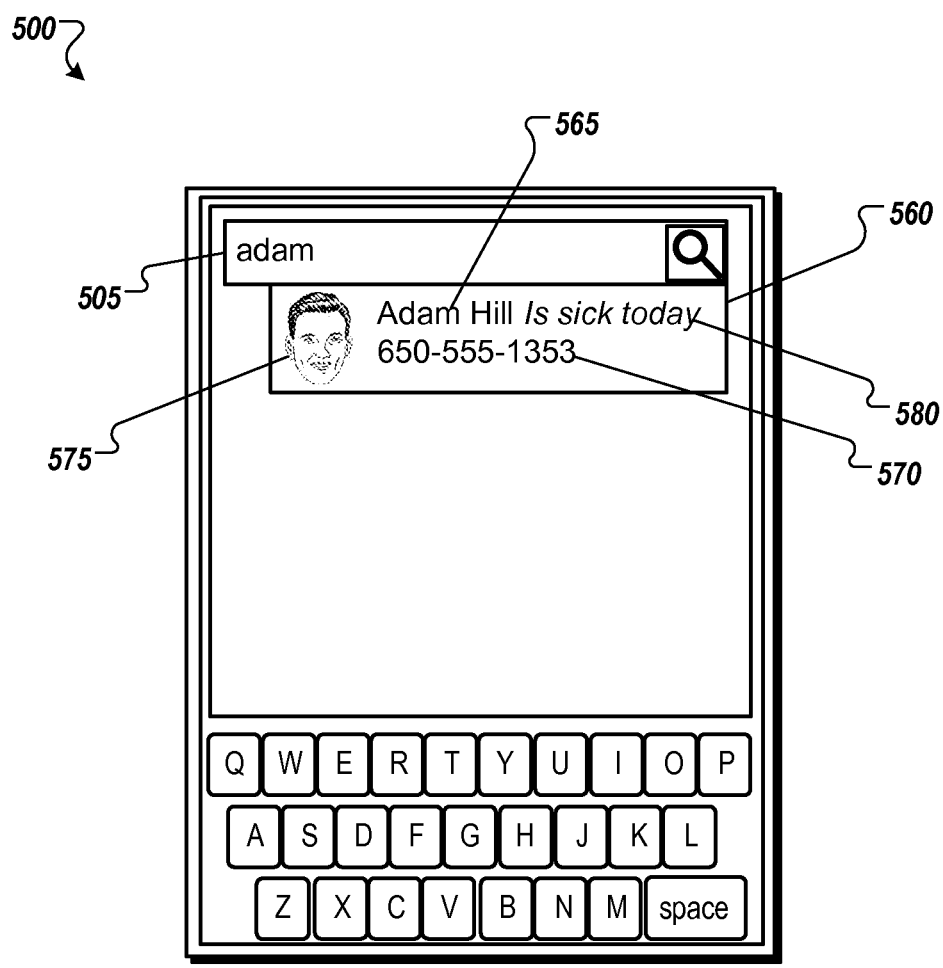

A live query is generated (430) to obtain live content that may be associated with the suggested query term. The live content is obtained (440), and provided to the client device (450), thereby ending the process 400 (460). Providing the live content may include displaying or otherwise outputting the live content, or to transmitting data identifying the live content to another entity (e.g., the client device). This live content may be included in a HTML document that the client device 102 processes in order to display the live content FIGS. 5A-5C show an exemplary user interface 500 in various search context dependent states. In the example of FIG. 5A, a user has entered a search query term of "pizza" into a search input box 505 by typing on a keypad 510. Using methods and techniques described previously, the user interface 500 displays a list of suggested query terms in entries 515-525. In present example, the suggested query term included in the entry 515 may be based upon the user's present location, for example, based on location information obtained from a GPS receiver, determined by proximity to cellular towers, or by Wi-Fi positioning techniques. Based on the user's location, the entry 515 displays the name of a nearby pizzeria, an address, and a distance measurement between the user's present location and the pizzeria. The entry 520 includes a link to a mapping application or website, that may provide the user with a convenient way to search for map locations associated with the query term "pizza." The entry 525 includes a link to perform an search for the company "Pizza Hut."

In the example of FIG. 5B, the user has entered a search query of "weather nyc" into the search input box 505. Using methods and techniques described previously, the user interface 500 displays a list of suggested query terms in entries 530, 545, and 550. In the present example, the query term "weather nyc" may have been analyzed by a search engine to disambiguate the term "nyc" to mean "New York, N.Y." and then uses the disambiguated term in association with the term "weather" to provide the entries 530, 545, and 550. The entry 530 displays the results of a live query for the current weather conditions for New York, N.Y., and includes an image 535 that symbolizes the current weather conditions (e.g., thunderstorms) and a textual display 540 of the forecasted high and low temperatures and weather forecast for the day. The entry 545 includes a link to a ten day weather forecast for New York City, while the entry 550 includes a link to a more general search for weather forecasts for New York City.

In the example of FIG. 5C, the user has entered a search query of "adam" into the search input box 505. Using methods and techniques described previously, the user interface 500 displays a suggested query term in entry 560. In the present example, the suggested query term may have been analyzed to determine that the search query term may be part of a person's name (e.g., "Adam"). Furthermore, the user may be associated with a person named "Adam Hill," for example, because Adam Hill may be the user's "friend" on a social networking site, an instant messaging peer, a contact in the user's phone book, or a contact that this user has historically had communications with. The entry 560 includes the name 565 of "Adam Hill" and a phone number 570. Furthermore, the entry 560 also includes live content, such as an updated picture 575 obtained from Adam Hill's Facebook profile, and a status 580 obtained from Adam Hill's latest Twitter "tweet" (e.g., "is sick today").

FIGS. 6A-6D also illustrate an exemplary user interface 600 in various search context dependent states. In some implementations, the search application 600 may be the user interface 108 of FIG. 1. In the illustrated examples, a user has entered the character "w" into a search box 605. FIG. 6A shows a drop down list 610 that includes a list of search query suggestions, such as a suggested query term 615 for "weather," other suggestions that may be generated from the user-entered query term "w." In some implementations, the list of suggested query terms may be obtained from a search engine, such as the search engine 250 of FIG. 2. In some implementations, the search query suggestions may be dynamically revised as the user enters information into the search box 605 (e.g., prefixing). In some implementations, FIG. 6A may illustrate the drop-down list 610 in a state that exists after the search engine suggests query terms and before the search engine provides live content for at least some of the suggested query terms.

FIG. 6B illustrates an example of how the information shown in the drop down list 610 may be modified to display live content. In the example of FIG. 6B, the suggested query term 615 is replaced with a description 618, and live content 620. The entry that includes the description 618 and the live content 620 occupies a greater vertical space than the suggested query term 615. A list of the remaining suggested query terms 625 is moved downward to accommodate the increased vertical size of the updated suggested query term 620 relative to vertical size of the suggested query term 615.

FIG. 6C illustrates an example of how the information shown in the drop down list 610 may be modified to display live content. In the example of FIG. 6C, the first entry includes the suggested query term 615, a description 630 associated with the suggested query term 615, and live content 632. Since the first entry occupies a large vertical space, the list of the remaining suggested query terms 625 is moved downward as an accommodation.

FIG. 6D illustrates yet another example of how the information shown in the drop down list 610 may be modified to display live content. In the example of FIG. 6D, the first entry includes the suggested query term 615 and an icon 640 that depicts the live content for a location associated with the user (e.g., the user's present location, home location, recently searched location). In the present example, the icon 640 is displayed in a location adjacent to the suggested query term 615 without occupying additional vertical space, thus not requiring the remaining suggested query terms 625 to be displaced.

Figure 7:
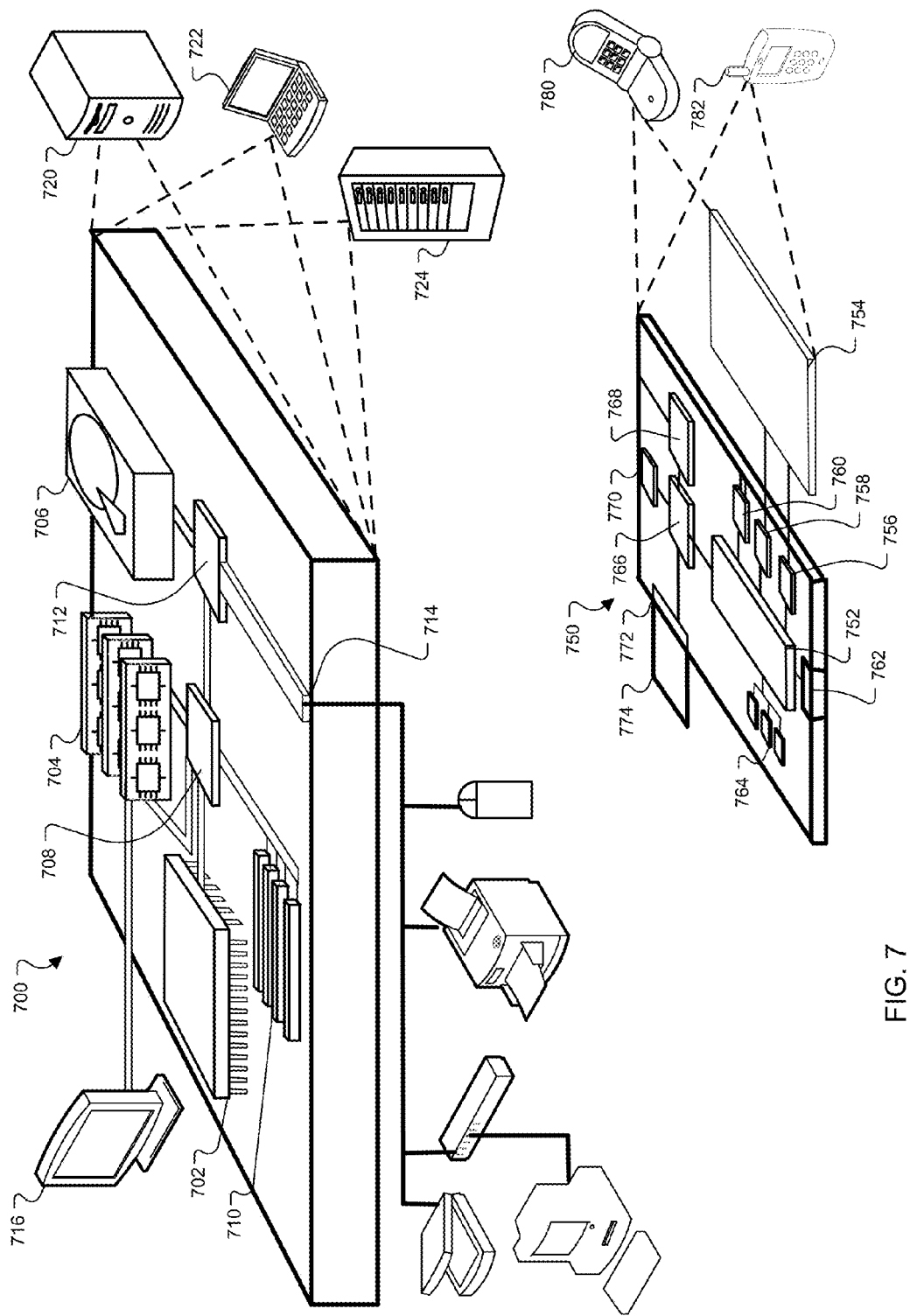

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or the memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or a memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A non-transitory computer storage medium encoded with a computer program, the program comprising instructions that when executed by data processing apparatus cause the data processing apparatus to perform operations comprising:
receiving, at a client device, a partial query term;
transmitting, by the client device and to a search engine, a search query request that includes the partial query term;
in response to the search query request, receiving, by the client device and from the search engine, (i) a suggested query term generated for the partial query term by the search engine, and (ii) content relating to the suggested query term that was indexed by the search engine before the search query request was transmitted;
in response to receiving the suggested query term and the content relating to the suggested term that was indexed by the search engine before the search query request was transmitted, providing for display, on a user interface of the client device, the suggested query term and the indexed content;
after receiving the suggested query term and the content relating to the suggested query term that was indexed by the search engine before the search query request was transmitted, transmitting, from the client device, a live query to obtain live content relating to the suggested query term, the live content being an update to the content that was indexed by the search engine, wherein the live content comprises information obtained at or after a time when the search query request was transmitted, and wherein the live content comprises information whose associated value is not pre-indexed by the search engine when the search query request was transmitted;
obtaining, at the client device, the live content; and
providing for display the live content to update the content on the user interface of the client device.

2. The computer storage medium of claim 1, wherein providing for display, on the user interface of the client device, the live content comprises providing for display, the live content on a same line as the suggested query term within a drop-down list on a user interface of the client device.

3. The computer storage medium of claim 2, wherein providing for display, the live content on a same line as the suggested query term within a drop-down list on a user interface of the client device comprises displaying the live content on a same line as the suggested query term within a drop-down list on a user interface of the client device, the live content being adjacent to the suggested query term on a list of suggested query terms.

4. The computer storage medium of claim 1, wherein receiving, by the client device and the search engine, (i) the suggested query term generated for the partial query term by the search engine, further comprises:
accessing a user's personalized search history, and
generating the suggested query term using the user's personalized search history.

5. The computer storage medium of claim 1, wherein, when the suggested query term identifies a business, the live content comprises a current stock price for the business.

6. The computer storage medium of claim 1, wherein, when the suggested query term identifies a location, the live content comprises current weather information for the location.

7. The computer storage medium of claim 1, wherein, when the suggested query term identifies a point-of-interest (POI), the live content comprises a distance between the POI and a current location of a client device.

8. The computer storage medium of claim 1, wherein, when the suggested query term identifies a person, the live content comprises a status of the person.

9. The computer storage medium of claim 1, wherein the operations further comprise:
determining that a user has selected a control to invoke a search dialogue,
wherein the suggested query term is automatically obtained responsive to determining that the user has selected the control.

10. The computer storage medium of claim 1, wherein the operations further comprise:
detecting that the user has selected a link that includes the live content; and
accessing a web document relating to the suggested query term based on detecting that the user has selected link.

11. A computer-implemented method comprising:
receiving, at a client device, a partial query term;
transmitting, by the client device and to a search engine, a search query request that includes the partial query term;
in response to the search query request, receiving, by the client device and from the search engine, (i) a suggested query term generated for the partial query term by the search engine, and (ii) content relating to the suggested query term that was indexed by the search engine before the search query request was transmitted;

in response to receiving the suggested query term and the content relating to the suggested term that was indexed by the search engine before the search query request was transmitted, providing for display, on a user interface of the client device, the suggested query term and the indexed content;

after receiving the suggested query term and the content relating to the suggested query term that was indexed by the search engine before the search query request was transmitted, transmitting, from the client device, a live query to obtain live content relating to the suggested query term, the live content being an update to the content that was indexed by the search engine, wherein the live content comprises information obtained at or after a time when the search query request was transmitted, and wherein the live content comprises information whose associated value is not pre-indexed by the search engine when the search query request was transmitted;

obtaining, at the client device, the live content; and providing for display the live content to update the content on the user interface of the client device.

12. The computer-implemented method of claim 11, wherein providing for display, on the user interface of the client device, the live content comprises providing for display, the live content on a same line as the suggested query term within a drop-down list on a user interface of the client device.

13. The computer-implemented method of claim 12, wherein providing for display, the live content on a same line as the suggested query term within a drop-down list on a user interface of the client device comprises displaying the live content on a same line as the suggested query term within a drop-down list on a user interface of the client device, the live content being adjacent to the suggested query term on a list of suggested query terms.

14. The computer-implemented method of claim 11, wherein receiving, by the client device and the search engine, (i) the suggested query term generated for the partial query term by the search engine, further comprises:

accessing a user's personalized search history, and generating the suggested query term using the user's personalized search history.

15. The computer-implemented method of claim 11, wherein, when the suggested query term identifies a business, the live content comprises a current stock price for the business.

16. The computer-implemented method of claim 11, wherein, when the suggested query term identifies a location, the live content comprises current weather information for the location.

17. The computer-implemented method of claim 11, wherein, when the suggested query term identifies a point-of-interest (POI), the live content comprises a distance between the POI and a current location of a client device.

18. The computer-implemented method of claim 11, wherein, when the suggested query term identifies a person, the live content comprises a status of the person.

19. The computer-implemented method of claim 11, further comprising:

determining that a user has selected a control to invoke a search dialogue, wherein the suggested query term is automatically obtained responsive to determining that the user has selected the control.

20. The computer-implemented method of claim 11, further comprising:

detecting that the user has selected a link that includes the live content; and accessing a web document relating to the at least one suggested query terms based on detecting that the user has selected link.

21. A system comprising:

one or more computers and one or more storage devices storing instructions that are operable, when executed by the one or more computers, to cause the one or more computers to perform operations comprising:

receiving, at a client device, a partial query term;

transmitting, by the client device and to a search engine, a search query request that includes the partial query term;

in response to the search query request, receiving, by the client device and from the search engine, (i) a suggested query term generated for the partial query term by the search engine, and (ii) content relating to the suggested query term that was indexed by the search engine before the search query request was transmitted;

in response to receiving the suggested query term and the content relating to the suggested term that was indexed by the search engine before the search query request was transmitted, providing for display, on a user interface of the client device, the suggested query term and the indexed content;

after receiving the suggested query term and the content relating to the suggested query term that was indexed by the search engine before the search query request was transmitted, transmitting, from the client device, a live query to obtain live content relating to the suggested query term, the live content being an update to the content that was indexed by the search engine, wherein the live content comprises information obtained at or after a time when the search query request was transmitted, and wherein the live content comprises information whose associated value is not pre-indexed by the search engine when the search query request was transmitted;

obtaining, at the client device, the live content; and providing for display the live content to update the content on the user interface of the client device.

* * * * *